US009037734B2

(12) United States Patent
Kim et al.

(10) Patent No.: US 9,037,734 B2
(45) Date of Patent: May 19, 2015

(54) METHOD FOR PERFORMING TRANSFER OF COLLABORATIVE SESSION CONTROL IN WIRELESS COMMUNICATION SYSTEM BASED ON INTERNET PROTOCOL MULTIMEDIA SUBSYSTEM

(75) Inventors: Lae Young Kim, Anyang-si (KR); Tae Hyeon Kim, Anyang-si (KR); Hyun Sook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 144 days.

(21) Appl. No.: 13/255,012

(22) PCT Filed: Mar. 15, 2010

(86) PCT No.: PCT/KR2010/001596
§ 371 (c)(1),
(2), (4) Date: Sep. 6, 2011

(87) PCT Pub. No.: WO2010/120047
PCT Pub. Date: Oct. 21, 2010

(65) Prior Publication Data
US 2012/0011257 A1   Jan. 12, 2012

(30) Foreign Application Priority Data

Apr. 17, 2009 (KR) .................. 10-2009-0033796
May 8, 2009 (KR) .................. 10-2009-0040424

(51) Int. Cl.
*G06F 15/16* (2006.01)
*H04L 29/06* (2006.01)

(52) U.S. Cl.
CPC ......... *H04L 65/1093* (2013.01); *H04L 65/1016* (2013.01)

(58) Field of Classification Search
CPC ....... H04L 67/14; H04L 67/148; H04L 69/24; H04L 29/06319
USPC .................. 709/227, 228; 455/414.3
See application file for complete search history.

(56) References Cited

U.S. PATENT DOCUMENTS 7,359,373 B2 * 4/2008 Kuusinen et al. ............. 370/352
7,764,632 B2 * 7/2010 Gray et al. .................... 370/260

(Continued)

FOREIGN PATENT DOCUMENTS

| KR | 10-2007-0098372 A | 10/2007 |
|----|-------------------|---------|
| KR | 10-2007-0099849 A | 10/2007 |
| WO | WO 2005/039132 A1 | 4/2005  |

*Primary Examiner* — Kevin Bates
*Assistant Examiner* — Clarence D McCray
(74) *Attorney, Agent, or Firm* — Birch, Stewart, Kolasch & Birch, LLP

(57) ABSTRACT

A method for performing inter-user equipment (UE) transfer (IUT) of collaborative session control performed by a UE in a network system based on an Internet protocol (IP) multimedia subsystem (IMS) is provided. The method includes transmitting to an IMS network element a subscription message for requesting notification of information regarding other UE, receiving from the IMS network element a subscription acceptance message in response to the subscription message, receiving from the IMS network element a notification message comprising information regarding at least one different UE, and if a UE for transferring the collaborative session control is selected by the at least one different UE, performing a process of transferring the collaborative session control to the selected UE. A signaling overhead caused by a failure in the transfer of collaborative session control can be reduced.

10 Claims, 12 Drawing Sheets

(56) References Cited

U.S. PATENT DOCUMENTS

| | | | | |
|---|---|---|---|---|
| 7,822,065 B2* | 10/2010 | Lu | | 370/469 |
| 7,835,742 B2* | 11/2010 | Jaakkola et al. | | 455/436 |
| 7,990,957 B2* | 8/2011 | Song et al. | | 370/354 |
| 8,141,115 B2* | 3/2012 | Wohlert et al. | | 725/48 |
| 8,385,903 B2* | 2/2013 | Ghai et al. | | 455/420 |
| 8,483,101 B2* | 7/2013 | Albert et al. | | 370/266 |
| 8,582,566 B2* | 11/2013 | Bae et al. | | 370/353 |
| 8,671,201 B2* | 3/2014 | Keller et al. | | 709/227 |
| 2002/0061743 A1* | 5/2002 | Hutcheson et al. | | 455/426 |
| 2008/0020745 A1* | 1/2008 | Bae et al. | | 455/422.1 |
| 2009/0059835 A1* | 3/2009 | Motegi et al. | | 370/312 |
| 2009/0175268 A1* | 7/2009 | Li et al. | | 370/352 |
| 2009/0185557 A1 | 7/2009 | Song et al. | | |
| 2009/0313378 A1* | 12/2009 | Mahdi et al. | | 709/227 |
| 2010/0099396 A1* | 4/2010 | Huq et al. | | 455/420 |
| 2010/0169483 A1* | 7/2010 | Jalkanen | | 709/224 |
| 2010/0279670 A1* | 11/2010 | Ghai et al. | | 455/414.3 |
| 2010/0312832 A1* | 12/2010 | Allen et al. | | 709/204 |
| 2010/0312841 A1* | 12/2010 | Doken et al. | | 709/206 |
| 2011/0113169 A1* | 5/2011 | Maeng et al. | | 710/106 |
| 2013/0073508 A1* | 3/2013 | Zhou et al. | | 706/47 |

* cited by examiner

METHOD FOR PERFORMING TRANSFER OF COLLABORATIVE SESSION CONTROL IN WIRELESS COMMUNICATION SYSTEM BASED ON INTERNET PROTOCOL MULTIMEDIA SUBSYSTEM

TECHNICAL FIELD

The present invention relates to an Internet protocol (IP) multimedia subsystem (IMS)-based system, and more particularly, to a method for performing transfer of collaborative session control.

BACKGROUND ART

An Internet protocol (IP) multimedia subsystem (IMS) is drawing attention as a core communication system for providing a new service in an IP-based next generation communication environment. The IMS provides a variety of multimedia services in a mobile communication network environment and integrates an IP network and a mobile communication environment as a set of nodes for performing call control. Therefore, the IMS facilitates an interoperation between a user terminal and the IP network, so that an IP-based multimedia service can be provided by using the user terminal. The IMS consists of three layers, that is, a connectivity layer for connection to the IMS, a control layer for managing call and session routing, accounting, and file protocols, and an application layer for storing and managing data and generating a service for a subscriber.

The IMS can support a variety of contents types (e.g., voice, multimedia data, text, etc.) by interoperating with an existing telephone network (i.e., public switched telephone network (PSTN)) and the Internet. An IP-based multimedia service provided by the IMS can be roughly classified into a messaging service, a voice service, and a video service. The message service includes a short messaging service (SMS), a multimedia messaging service (MMS), an e-mail service, a session initiation protocol (SIP) for instant messaging and presence leveraging extensions-instant message (SIMPLE-IM) service, an instant messaging and presence service (IMPS), etc. The voice service includes a voice over IP (VoIP) service, a push-to-talk over cellular (PoC) service, etc. The video service includes a video-over IP (Video-oIP), etc.

These services have their own protocol silos to transmit respective messages. That is, these services transmit the messages by using a transport protocol unique for each service. A transport protocol currently used by each service is summarized by Table 1 below.

TABLE 1

| Service Type | Transfer Protocol |
|---|---|
| SMS | Call Signaling Protocol |
| MMS | WSP(Wireless Session Protocol) or HTTP(Hyper text Transfer Protocol) |
| E-mail | IETF(Internet Engineering Taskforce Team) Lemonade IMAP(Internet Messaging Access Protocol), DS(Data Synchronization) |
| SIMPLE-IM | SIP(Session Initiation Protocol)/SIMPLE and MSRP (Message Session Relay Protocol) |
| IMPS | WSP or HTTP |
| VoIP | SIP/RTP(Real-time Transport Protocol) |
| PoC | SIP/RTP |
| Video_oIP | SIP/RTP |

Referring to Table 1, the IMS uses a session initiation protocol (SIP) which is a signaling protocol usable for the IP-based multimedia service. The SIP is a call control protocol of the application layer for generating, modifying, and ending an IP-based multimedia service session between user terminals or between a user terminal and an entity having an IP address by finding a location of a remote user terminal to which communication is desired.

In an IMS system, a plurality of user equipments (UEs) may be involved in a collaborative session. In this case, one UE can control media flows within the collaborative session, whereas the remaining UEs perform transmission and reception of the media flows. As such, a UE that provides service control for the collaborative session is referred to as a controller UE, and controlled UEs that provide the media flows to the collaborative session are referred to as controllee UEs. A controller UE may provide media flows for a collaborative session. The service control for the media flows constituting the collaborative session is referred to as collaborative session control, or simply referred to as service control. In addition, a media flow for a specific UE or collaborative session control can be transferred to a different UE, a media flow can be added to a different UE, or a media flow generated in the different UE or collaborative session control can be removed. Such a function is widely referred to as inter-UE transfer (hereinafter, IUT).

When performing IUT of collaborative session control, whenever a state or capability of a UE changes, it is notified to another UE which requests notification of the state or capability information of the UE. Among UEs, some of them may not be able to perform the transfer of collaborative session control depending on situation.

In this case, a controller UE cannot know which UE can perform the transfer of collaborative session control. Therefore, the controller UE attempts the transfer of collaborative session control to a UE unable to perform the transfer of collaborative session control, which results in a signaling overhead caused by a failure in the transfer of collaborative session control. Accordingly, there is a need for a method for effectively performing the transfer of collaborative session control.

DISCLOSURE OF INVENTION

Technical Problem

The present invention provides a method for performing inter-user equipment (UE) transfer (IUT) of collaborative session control in order to prevent unachievable transfer of collaborative session control by determining whether the transfer of collaborative session control can be performed on the basis of state or capability information of a different UE.

Solution to Problem

According to an aspect of the present invention, a method for performing inter-user equipment (UE) transfer (IUT) of collaborative session control performed by a UE in a network system based on an Internet protocol (IP) multimedia subsystem (IMS) is provided. The method includes transmitting to an IMS network element a subscription message for requesting notification of information regarding other UE, receiving from the IMS network element a subscription acceptance message in response to the subscription message, receiving from the IMS network element a notification message comprising information regarding at least one different UE, and if a UE for transferring the collaborative session control is selected by the at least one different UE, performing a process of transferring the collaborative session control to the selected UE.

According to another aspect of the present invention, a method for performing IUT of collaborative session control performed by a network element IMS-based network system is provided The method includes receiving, at a network element, a control message from a different UE, the control message including a service control flag, the service control flag indicating availability or unavailability of being a control UE, transmitting, from the network element to a UE, a notification message including the service control flag, the service control flag notifying the registration of the different UE to the IMS network, if the service control flag indicates availability of being the controller UE, receiving, at the network element, a request message from the UE, the request message for indicating the request of a collaborative session control transfer to the different UE, and transmitting, from the network element to the UE, a completion message for indicating the completion of the collaborative session control transfer.

Advantageous Effects of Invention

According to the present invention, a user equipment (UE) can configure flags related to inter-UE transfer (IUT) of collaborative session control and can be registered to an Internet protocol (IP) multimedia subsystem (IMS) network by including the configured flag values. Therefore, other UEs state or capability information required for transfer of collaborative session control can be effectively obtained. As a result, a signaling overhead caused by a failure in the transfer of collaborative session control can be reduced. In addition, the IMS network notifies information indicating a generation and change of a controller UE to another UE, and by using this information, the another UE can obtain collaborative session control from the controller UE.

MODE FOR THE INVENTION

Hereinafter, exemplary embodiments of the present invention will be described in detail with reference to the accompanying drawings. The same reference numbers will be used throughout the drawings to refer to the same parts.

Figure 1:
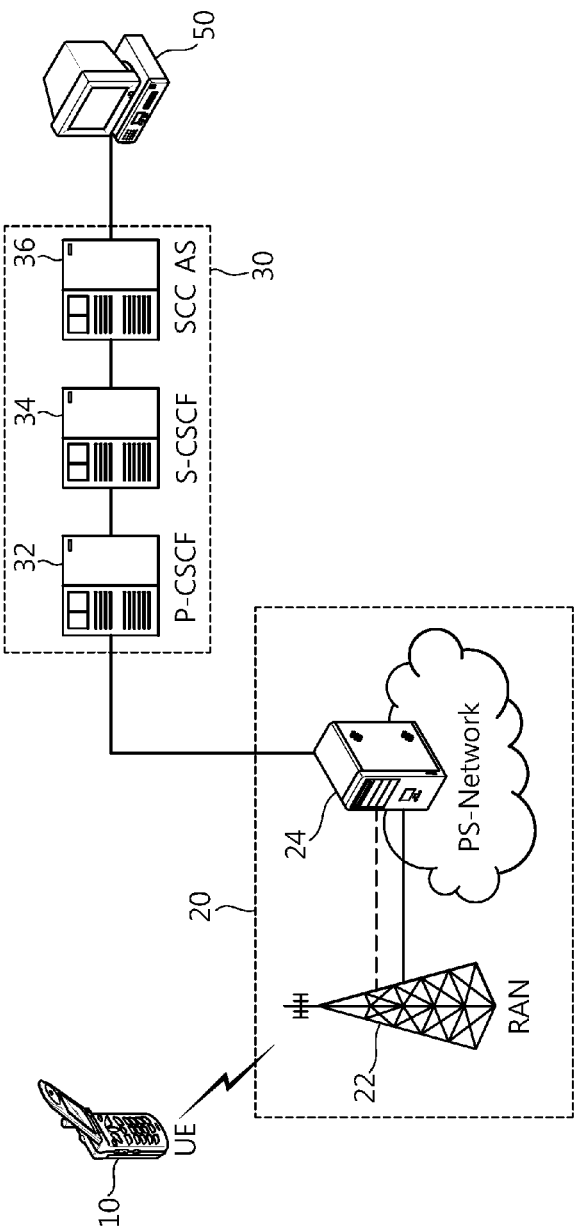
FIG. 1 shows a wireless communication system based on an Internet protocol (IP) multimedia subsystem (IMS).

FIG. 1 shows a wireless communication system based on an Internet protocol (IP) multimedia subsystem (IMS).

Referring to FIG. 1, the IMS-based wireless communication system includes a user equipment (UE) 10, a mobile communication network 20, and an IMS network 30.

The UE 10 is an apparatus for communication with network nodes constituting the IMS network or with another UE through a radio access network (RAN) such as an evolved-UMTS terrestrial radio access network (E-UTRAN). The term "UE" 10 is not particularly limited thereto. For example, the UE 10 may also be referred to as a mobile station (MS), a user terminal (UT), a mobile equipment (ME), a subscriber station (SS), a wireless device (or a wireless station), etc. The UE 10 is generally a mobile apparatus, but may also be a fixed apparatus. Examples of the mobile apparatus include a laptop, a personal digital assistant (PDA), a smart phone, a multimedia device, etc. Examples of the fixed apparatus include a personal computer (PC), a television, a fixed display device, etc. The UE 10 may have a unique identifier (ID) and IP address (or simply, IP addr). The ID may be a public user ID in a format of a session initiation protocol (SIP) uniform resource identifier (URI) or a TEL URI. Constitutional elements of the UE 10 are described in detail with reference to FIG. 2.

Figure 2:
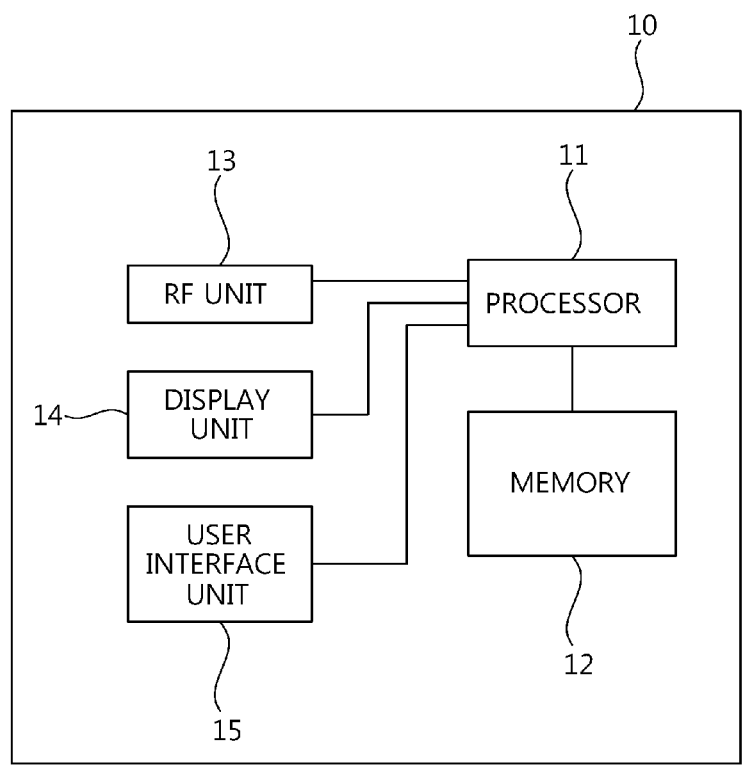
FIG. 2 is a block diagram showing constitutional elements of a UE.

FIG. 2 is a block diagram showing constitutional elements of a UE.

Referring to FIG. 2, a UE 10 includes a processor 11, a memory 12, a radio frequency (RF) unit 13, a display unit 14, and a user interface unit 15. The processor 11 implements various procedures for layers of a radio interface protocol, a wireless protocol, application protocol and a user interface protocol. Operations related to a procedure of generating and transmitting a register message for registration to an IMS network, a procedure of generating and transmitting an inter-UE transfer (IUT)-related message for performing IUT, and a session initiation/update procedure can be implemented by using the processor 11, and these procedures will be described below. The memory 12 is coupled to the processor 11 and stores an operating system of the UE, applications, and general files. The display unit 14 displays a variety of information of the UE and may use a well-known element such as a liquid crystal display (LCD), an organic light emitting diode (OLED), etc. The user interface unit 15 can be configured with a combination of well-known user interfaces such as a keypad, a touch screen, etc. The RF unit 13 is coupled to the processor 11 and transmits or receives radio signals.

Referring back to FIG. 1, the mobile communication network 20 routes an SIP message to achieve a call connection between the UE 10 and the IMS network 30. The mobile communication network 20 includes a radio access network (RAN) 22 and a packet switched (PS)-network 24.

The IMS network 30 includes a serving-call session control function (S-CSCF) 34 actually handling various sessions in a network, a proxy-call session control function (P-CSCF) 32 delivering an SIP message received from the UE 10 to the S-CSCF as a first access point to which the UE 10 is connected for access to the IMS network 30, and an service centralization and continuity application server (SCC AS) 36 as an application server supporting continuity of a multimedia session.

With regard to a session initiation to transmit and receive a media flow to and from a remote UE (i.e., a remote end) 50, the UE 10 first performs a registration procedure for notifying information related to its current location to the IMS network 30. The P-CSCF, the S-CSCF, and the SCC AS participate in the registration procedure. A process of registering a UE to an IMS network will be described hereinafter in detail.

Figure 3:
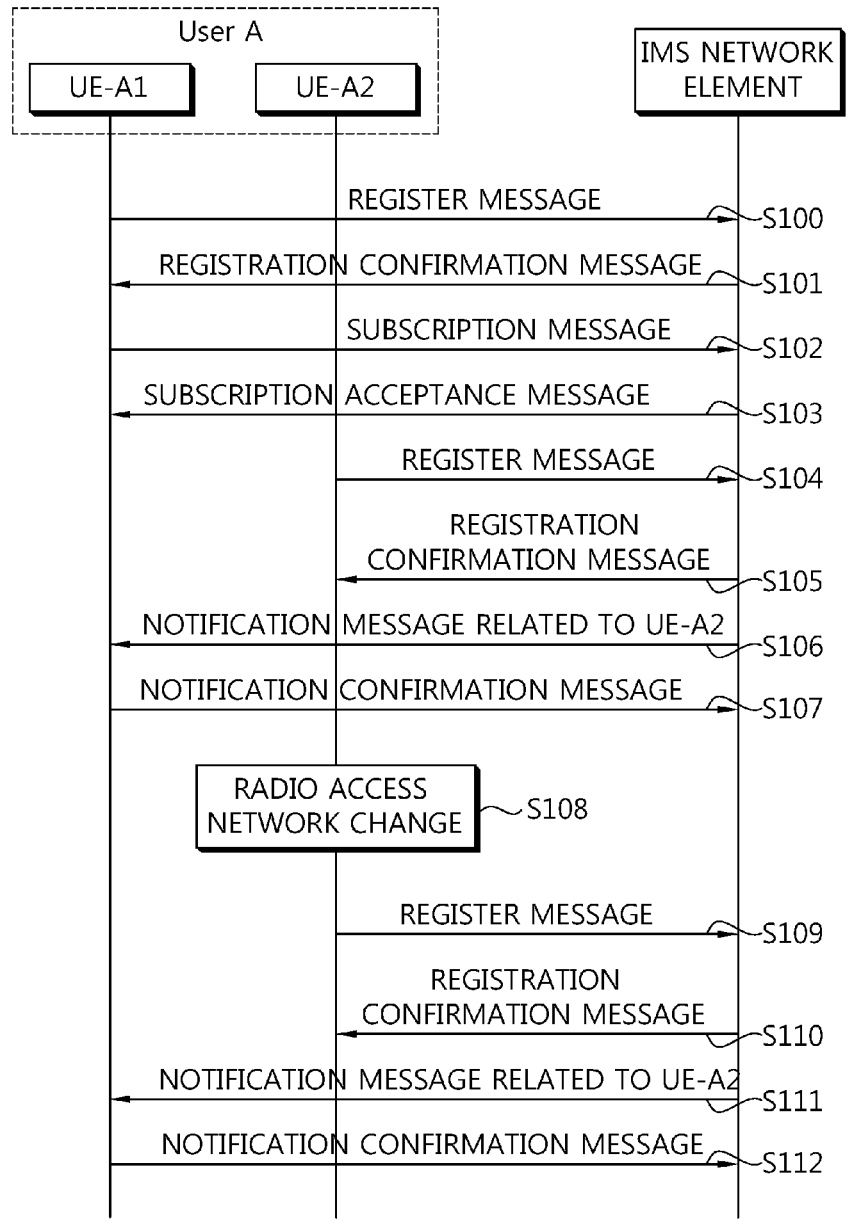
FIG. 3 is a flowchart for explaining a process of registering a UE to an IMS network.

FIG. 3 is a flowchart for explaining a process of registering a UE to an IMS network.

Referring to FIG. 3, a plurality of UEs (i.e., UE-A1 and UE-A2) sequentially perform the process of registering to the IMS network. The IMS network to which the plurality of UEs are registered is a home network. If an UE resides in a visited network, the UE is registered to the home network through the visited network. The UE-A1 and the UE-A2 may belong to the same user, or may belong to different users. The term "User" is not particularly limited thereto. For example, the user may also be referred to as a subscriber, an IMS subscription, a user subscription, a domain of a user, etc. Although it is shown in FIG. 3 that the UE-A1 and the UE-A2 belong to the same user (i.e., user A) for convenience of explanation, this is for exemplary purposes only, and thus the UE-A1 and the UE-A2 may belong to different users. Further, although only two UEs are shown in FIG. 3, a more number of associated UEs may be registered to the IMS network. An IMS network element is a physical or logical entity participating in the process of registering the UE to the IMS network, and may be a P-CSCF, an S-CSCF, or an SCC AS.

First, the UE-A1 transmits a register message (SIP REGISTER) to the IMS network element (step S100). The register message is an SIP message and includes state or capability information of the UE-A1. The state or capability information of the UE may include registration status information of the UE, information related to codec and media type supported by the UE, configuration related information such as a screen size, and information related to a radio access network to which the UE is currently connected. In addition, the state or capability information of the UE may be obtained from the UE in the IMS network via an OPTIONS message other than the register message. And if a database for managing the state or capability information of the UE exists, the state or capability information of the UE may be obtained from the database. If the UE-A1 exists in the visited network, the register message may be delivered to the S-CSCF (not shown in FIG. 3) via the P-CSCF (not shown in FIG. 3).

After registering the UE-A1, the IMS network element transmits a registration confirmation message (SIP 200 OK) to the UE-A1 (step S101). The UE-A1 transmits a subscription message (SIP SUBSCRIBE) to the IMS network element (step S102). If a specific UE desires to receive a service of notifying a change in state or capability information of another UE, the specific UE has to request the IMS network element to subscribe to an information change notification service. A message used in this step is the subscription message. The subscription message may also be referred to as an information notification subscription request message. The IMS network element transmits a subscription acceptance message to the UE-A1 to notify that the subscription is successfully performed (step S103).

Next, the UE-A2 is registered to the IMS network element (steps S104 and S105). The registration procedure is identical to the registration procedure performed by the UE-A1. When the UE-A2 is registered to the IMS network element, this is notified to the UE-A1 (step S106). A message used in this step is referred to as a notification message (SIP NOTIFY). Upon receiving the notification message, the UE-A1 transmits to the IMS network element a notification confirmation message for confirming reception of the notification message (step S107). The notification message is also transmitted when the UE-A2 moves to another radio access network. For example, if a connected radio access network changes when the UE-A2 moves (step S108), a new register message including information on the changed radio access network is transmitted to the IMS network element (step S109). As a result, a changed location of the UE-A2 is registered to the IMS network. In response thereto, the IMS network element transmits a registration confirmation message to the UE-A2 (step S110), and transmits a new notification message to the UE-A1 to notify the change in state information of the UE-A2 (step S111). The UE-A1 which additionally receives the notification message may transmit a notification confirmation message to the IMS network element to confirm reception of the notification message (step S112).

In this manner, a UE is registered to the IMS network and obtains state or capability information of another UE, and thus a media flow or collaborative session control can be transferred between different UEs or removed from different UE, or a media flow can be added to different UE. Such a function is referred to as inter-UE transfer (IUT). A part or entirety of the media flow can be transferred between a plurality of UEs by the IUT. Information related to performing the IUT may be included in the register message, or may be a separate control message. Meanwhile, the IUT is performed under the premise that a plurality of UEs are present. Hereinafter, the plurality of UEs supporting the IUT may belong to the same user, or may belong to different users.

Figure 4:
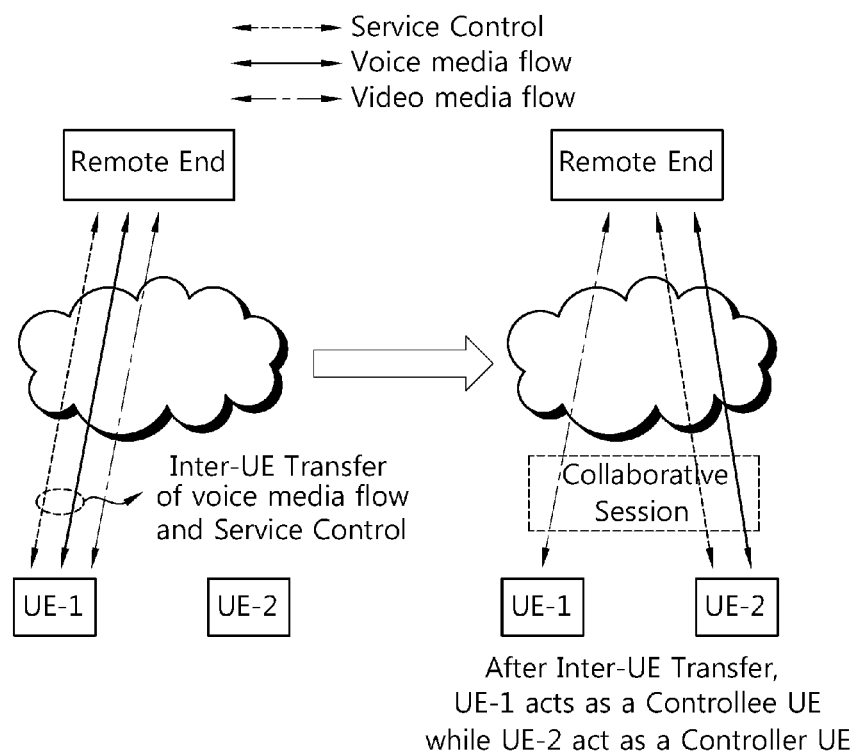
FIG. 4 shows transfer of a media flow and service control.

FIG. 4 shows transfer of a media flow and service control.

Referring to FIG. 4, a UE-1 communicates with a remote UE (i.e., a remote end) or a remote application server (hereinafter, a remote UE) through an IMS network. Herein, a voice media flow and a video media flow are provided between the UE-1 and the remote UE. The UE-1 has a service control right for the voice media flow and the video media flow. The media flows or the service control can be transferred between the UE-1 and a UE-2 by inter-UE transfer (IUT). Assume that only the service control and the voice media flow are transferred from the UE-1 to the UE-2 by the IUT. Then, a video media flow session still exists between the UE-1 and the remote UE, and a voice media flow session is newly established between the UE-2 and the remote UE. Meanwhile, the UE-2 has a service control for the video media flow and the voice media flow.

A plurality of sessions generated by the IUT are referred to as a collaborative session. Meanwhile, a UE providing service control for media flows constituting the collaborative session is referred to as a controller UE, and a UE whose transmission and reception of media flows are controlled by the controller UE is referred to as a controllee UE. The service control for the collaborative session provided by the controller UE is also referred to as collaborative session control.

Figure 5:
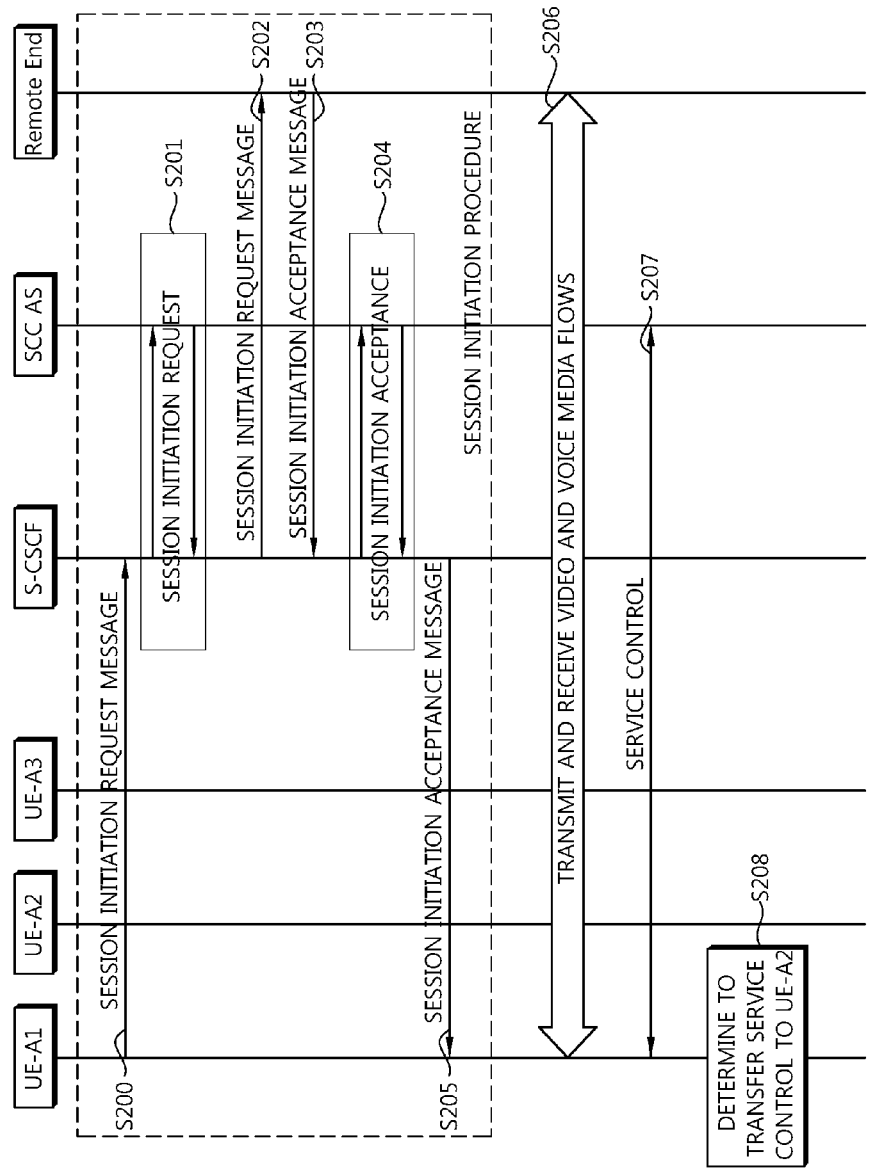
FIG. 5 and FIG. 6 are flowcharts for explaining a procedure of performing IUT of service control for a media flow.
Figure 6:
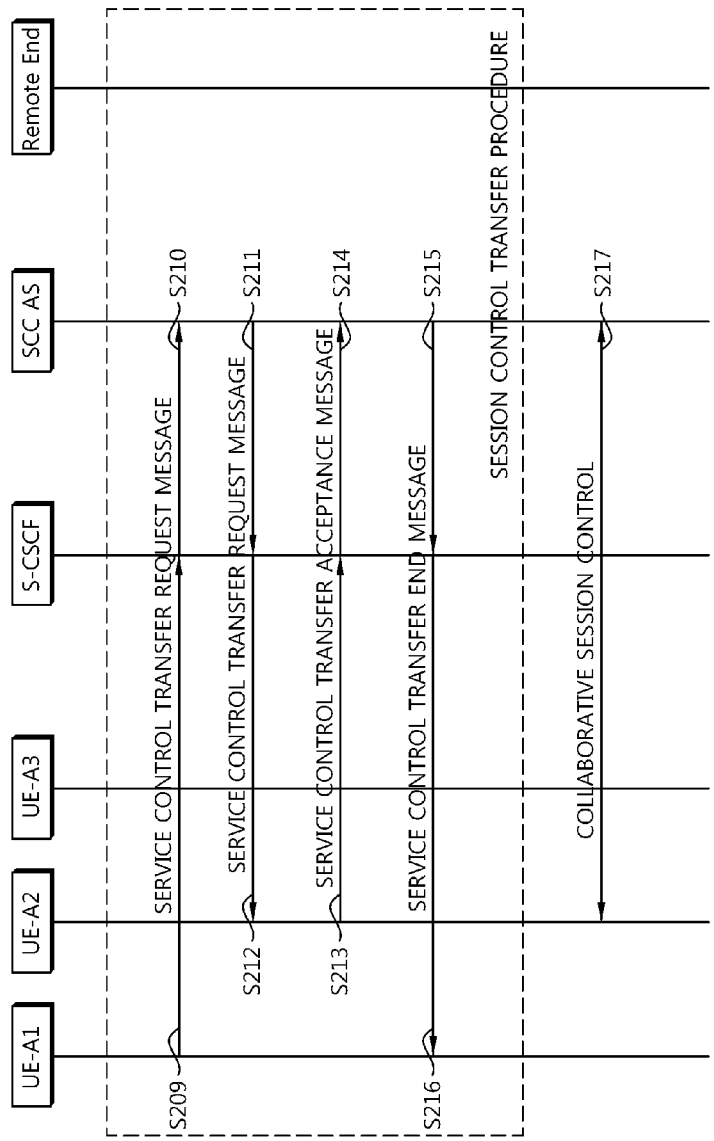

FIG. 5 and FIG. 6 are flowcharts for explaining a procedure of performing IUT of service control for a media flow.

Referring to FIG. 5 and FIG. 6, it is assumed that there are UEs (i.e., a UE-A1, a UE-A2, and a UE-A3) able to perform the IUT, and all of these UEs are registered to an IMS network according to the registration process of FIG. 3. Meanwhile, the UE-A1 is a UE subscribed to an information change notification service to receive notification of state or capability information of a different UE, and thus when a state or capability of the different UE changes, the IMS network can notify this change to the UE-A1. A session initiation procedure performed by the UE-A1 will be first explained.

The UE-A1 transmits a session initiation request message (SIP INVITE) to an S-CSCF (step S200). Media to be provided through a session in this case is voice media and video media. On the basis of subscriber information of a user A, a session initiation request procedure is performed between the S-CSCF and an SCC AS (step S201). When the S-CSCF delivers the session initiation request message to a remote UE (step S202), the remote UE transmits a session initiation acceptance message to the S-CSCF (step S203). The session initiation acceptance message is an SIP message and is also referred to as 200 OK. After a session initiation acceptance procedure is performed between the S-CSCF and the SCC AS (step S204), the S-CSCF transmits the session initiation acceptance message to the UE-A1 (Step S205). The procedure of steps S200 to S205 is hereinafter referred to as a session initiation procedure.

By using a session initiated as described above, voice and video media flows are transmitted and received between the UE-A1 and the remote UE (step S206), and the UE-A1 has a service control for the voice and video media flows (step S207).

The UE-A1 determines to transfer service control for the voice and video media flows to the UE-A2 (step S208). Since the UE-A1 is a user equipment, it can be said that whether to transfer the service control for the voice and video media flows is actually determined by the user A who is a user of the UE-A1 or without interaction with user A if a certain condition is satisfied. If it is determined to transfer the service control, a service control transfer procedure is performed. Steps S209 to S216 below are an example of the service control transfer procedure.

The UE-A1 transmits a service control transfer request message to the S-CSCF (step S209), and the S-CSCF transmits the service control transfer request message to the SCC AS (step S210). When the SCC AS transmits the service control transfer request message to the S-CSCF (step S211), the S-CSCF transmits it to the UE-A2 (step S212). In response thereto, if the UE-A2 transmits a service control transfer acceptance message to the S-CSCF (step S213), the S-CSCF delivers it to the SCC AS (step S214). When the SCC AS receives the service control transfer acceptance message from the UE-A2, the SCC AS transmits a service control transfer end message to the S-CSCF (step S215), and the S-CSCF forwards it to the UE-A1 (step S216). As a result, the UE-A2 has a control for a collaborative session consisting of voice and video media flows (step S217).

The service control transfer results in establishment of a collaborative session wherein the UE-A1 and the UE-A2 participate. In this case, voice and video media flows are still provided by the UE-A1, and control for the collaborative session consisting of the voice and video media flows is managed by the UE-A2. That is, the UE-A1 acts as a controllee UE, and the UE-A2 acts as a controller UE.

Occasionally, some UEs may not be able to act as controller UEs. In other words, IUT of collaborative session control may be impossible for some UEs. For example, if it is assumed that the UE-A2 is in a situation where it cannot be act as a controller UE, the UE-A1 or the IMS network cannot transfer the collaborative session control to the UE-A2. Even though the collaborative session control cannot be transferred to the UE-A2, there may be an unachievable attempt for transferring the collaborative session control to the UE-A2, which is unable to provide the collaborative session control. Such a failure occurs because the UE-A1 cannot know to which UE the collaborative session control is currently transferable or non-transferable.

To solve this problem, a service control flag is used as a control message for effectively performing IUT of collaborative session control. The service control flag is an indicator indicating 'controller enable' or 'controller disable' for indicating enable or disable of the IUT of collaborative session control. Herein, if a UE can perform the transfer of collaborative session control, it means that the UE acts as a controller UE, and if the UE cannot perform the transfer of collaborative session control, it means that the UE cannot act as the controller UE. For example, if a service control flag for a UE is a 1-bit indicator, the service control flag set to '0' may indicate that collaborative session control can be transferred to the UE (that is, the UE can act as the controller UE), whereas the service control flag set to '1' may indicate that collaborative session control cannot be transferred to the UE (that is, the UE cannot act as the controller UE).

For one example, assume that a service control flag for the UE-A2 is set to '1'. When the UE-A2 is registered to the IMS network element, the IMS network element notifies UE-A2 s registration status or UE-A2 s state or capability information, including information indicating that the service control flat is set to '1' to the UE-A1, that is, the controller UE. As a result, the UE-A1 can know that the UE-A2 cannot act as a controller UE, and thus does not attempt to perform the transfer of collaborative session control to the UE-A2.

For another example, assume that the service control flag for the UE-A2 is set to '0'. When the UE is registered to the IMS network element, the IMS network element transmits a notification message including UE-A2's registration status or UE-A2's state or capability information, including the service control flag to the UE-A1, that is, the controller UE. State or capability information of a UE may include registration status information of the UE, information related to codec and media type supported by the UE, configuration related information such as a screen size, and information related to a radio access network to which the UE is currently connected. Upon receiving the notification message, the UE-A1 can know that the UE-A2 is registered to the IMS network, and may consider the UE-A2 as a target to which collaborative session control is transferred. As such, by allowing the UE-A1 to reference the service control flag, an unnecessary attempt for transferring the collaborative session control can be prevented. Of course, this is for exemplary purposes only, and thus what indicated by bit information 0 or 1 may be used in an opposite manner, and the number of bits in use may be variable.

The service control flag may be included in either a register message or a separate SIP message. It is assumed hereinafter that the service control flag is included in the register message for convenience of explanation.

Figure 7:
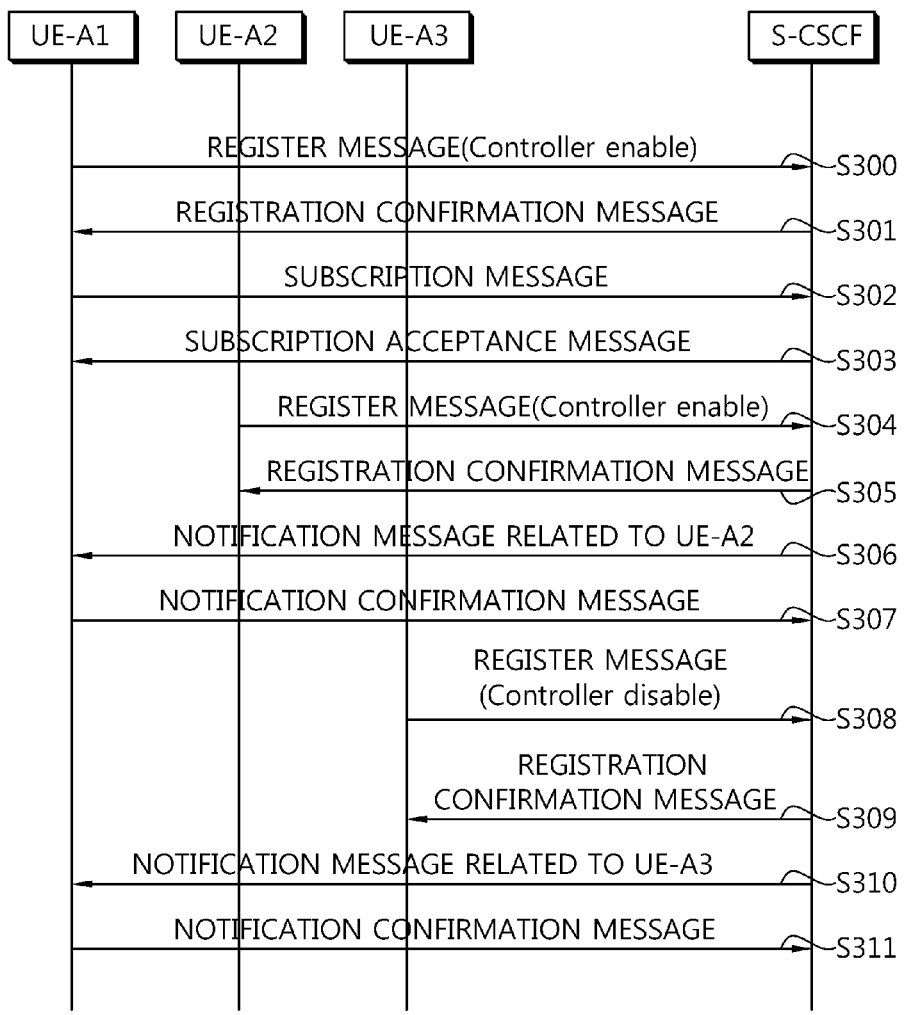
FIG. 7 is a flowchart showing a method for transmitting a service control flag according to an embodiment of the present invention.

FIG. 7 is a flowchart showing a method for transmitting a service control flag according to an embodiment of the present invention. In this case, an S-CSCF is used as an IMS network element for transmitting a notification message in the process of transmitting the service control flag.

Referring to FIG. 7, a UE-A1, a UE-A2, and a UE-A3 sequentially perform a process of registering to an IMS network. First, the UE-A1 transmits a register message (SIP REGISTER) including a service control flag to the S-CSCF to register to the IMS network (step S300). In this case, the service control flag indicates controller enable. The S-CSCF may store the service control flag of the UE-A1. When the UE-A1 is registered, the S-CSCF transmits a registration confirmation message (SIP 200 OK) to the UE-A1 (step S301). To receive notification of a change in state or capability information of other UEs, the UE-A1 transmits a subscription message (SIP SUBSCRIBE) to the S-CSCF (step S302), and in response thereto, the S-CSCF transmits a subscription acceptance message to the UE-A1 (step S303).

Next, the UE-A2 performs a registration process (steps S304 and S305). In this case, the S-CSCF may store a service control flag of the UE-A2. Since the service control flag of the UE-A2 indicates controller enable, the S-CSCF transmits to the UE-A1 a notification message (SIP NOTIFY) for notifying that the UE-A2 which supports transfer of collaborative session control, is registered to the IMS network (step S306). In response thereto, the UE-A1 transmits to the S-CSCF a notification confirmation message for indicating that the notification is confirmed (step S307). Finally, the UE-A3 performs a registration process (steps S308 and S309). Unlike the UE-A1 and the UE-A2, a service control flag of the UE-A3 indicates controller disable. Therefore, the S-CSCF transmits to the UE-A1 a notification message (SIP NOTIFY) indicating that the UE-A3 unable to perform the transfer of collaborative session control, is registered to the IMS network (step S310). In response thereto, the UE-A1 transmits to the S-CSCF a notification message indicating that the notification is confirmed (step S311).

A reason that transmission of the notification message of the S-CSCF is triggered is described in FIG. 7 only for a case where a UE is registered. However, this is for exemplary purposes only, and thus the present invention can also apply to all cases where state or capability information of the UE changes. Examples of such cases are where the registration of the UE is released or a radio access network changes, or where capability information of the UE changes. In addition, as described above, the UE-A1, the UE-A2, and the UE-A3 may belong to the same user A, or may belong to different users.

Figure 8:
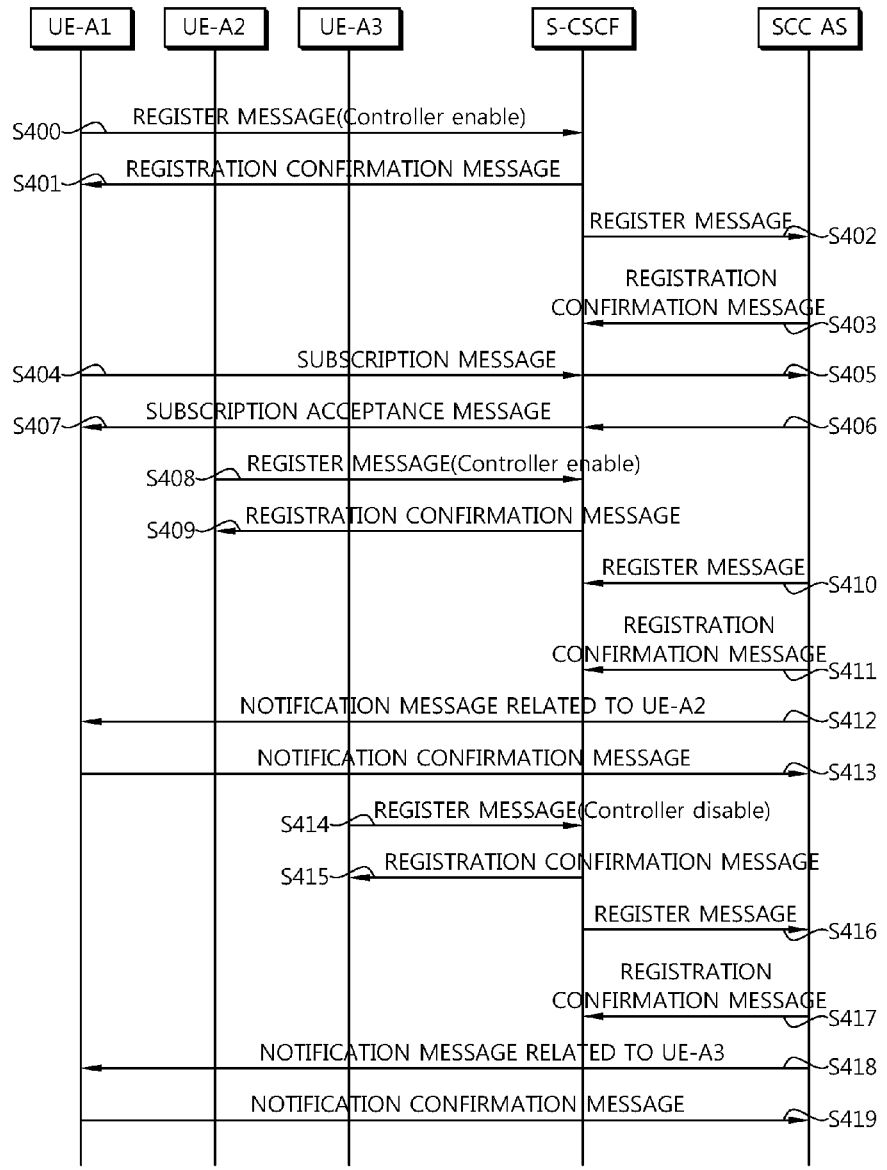
FIG. 8 is a flowchart showing a method for transmitting a service control flag according to another embodiment of the present invention.

FIG. 8 is a flowchart showing a method for transmitting a service control flag according to another embodiment of the present invention. In this case, an SCC AS is used as an IMS network element for transmitting a notification message in the process of transmitting the service control flag.

Referring to FIG. 8, a UE-A1, a UE-A2, and a UE-A3 sequentially perform a process of registering to an IMS network. First, the UE-A1 transmits a register message (SIP REGISTER) including a service control flag to an S-CSCF to register to the IMS network (step S400). In this case, the service control flag indicates controller enable. When the UE-A1 is registered, the S-CSCF transmits a registration confirmation message (SIP 200 OK) to the UE-A1 (step S401). In association with the registration of the UE-A1, the S-CSCF delivers to the SCC AS the register message including the service control flag received from the UE-A1 (step S402), and receives a registration confirmation message from the SCC AS (step S403). The SCC AS may store a service control flag of the UE-A1.

To receive notification of a change in state or capability information of other UEs, the UE-A1 transmits a subscription message (SIP SUBSCRIBE) to the S-CSCF (step S404), and the S-CSCF delivers it to the SCC AS (step S405). In response thereto, the SCC AS transmits a subscription acceptance message to the S-CSCF (step S406), and the S-CSCF delivers it to the UE-A1 (step S407).

Next, the UE-A2 performs a registration process (steps S408 to S411). Since the service control flag of the UE-A2 indicates controller enable, the SCC AS transmits to the UE-A1 a notification message (SIP NOTIFY) for notifying that the UE-A2, which supports the transfer of collaborative session control, is registered to the IMS network (step S412). In response thereto, the UE-A1 transmits to the SCC AS a notification confirmation message for indicating that the notification is confirmed (step S413).

Finally, the UE-A3 performs a registration process (steps S414 to S417). Unlike the UE-A1 and the UE-A2, a service control flag of the UE-A3 indicates controller disable. Therefore, the SCC AS transmits to the UE-A1 a notification message (SIP NOTIFY) indicating that the UE-A3 unable to perform the transfer of collaborative session control, is registered to the IMS network (step S418). In response thereto, the UE-A1 transmits to the SCC AS a notification confirmation message indicating that the notification is confirmed (step S419).

Figure 9:
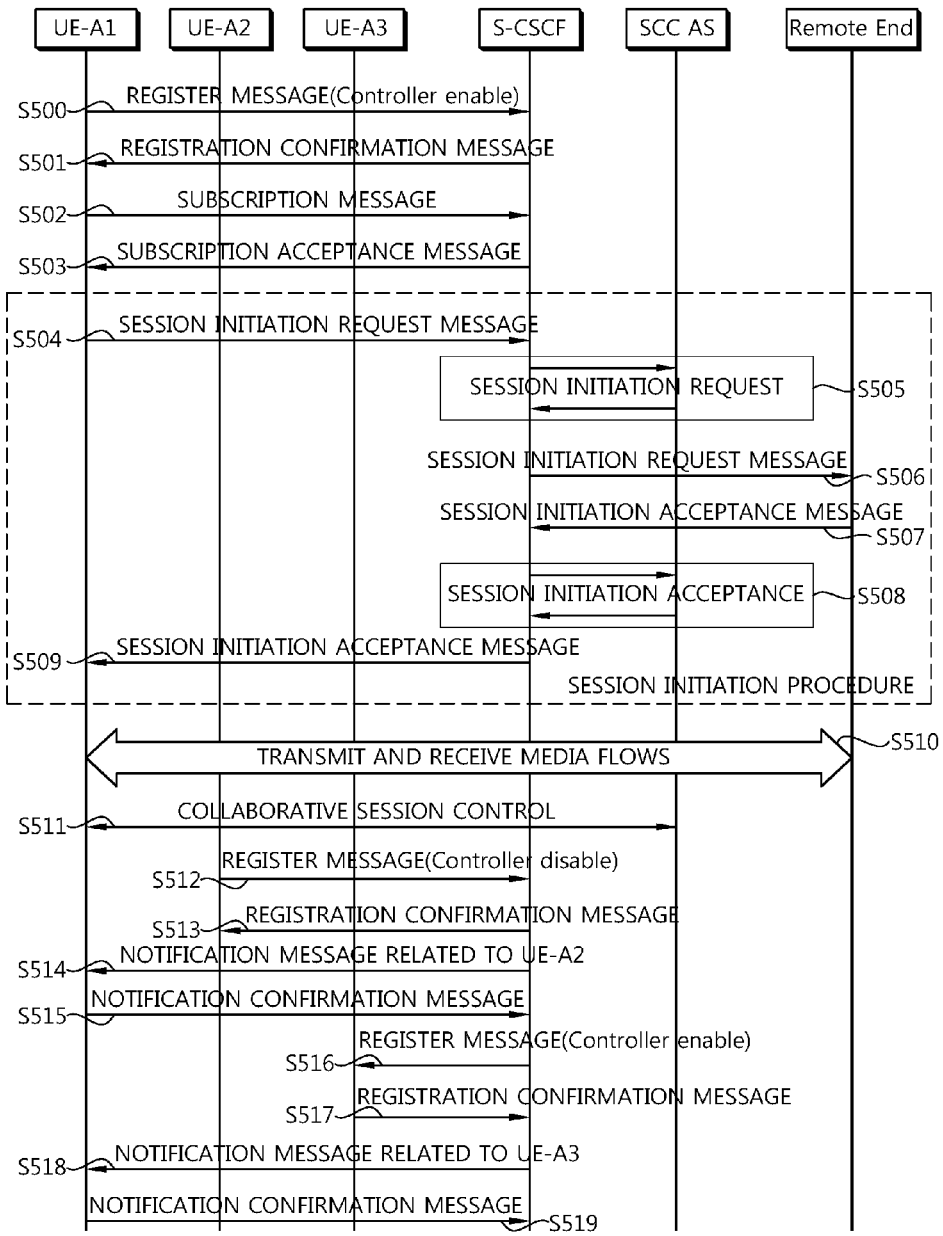
FIG. 9 and FIG. 10 are flowcharts showing a method of transferring service control for a media flow according to an embodiment of the present invention.
Figure 10:
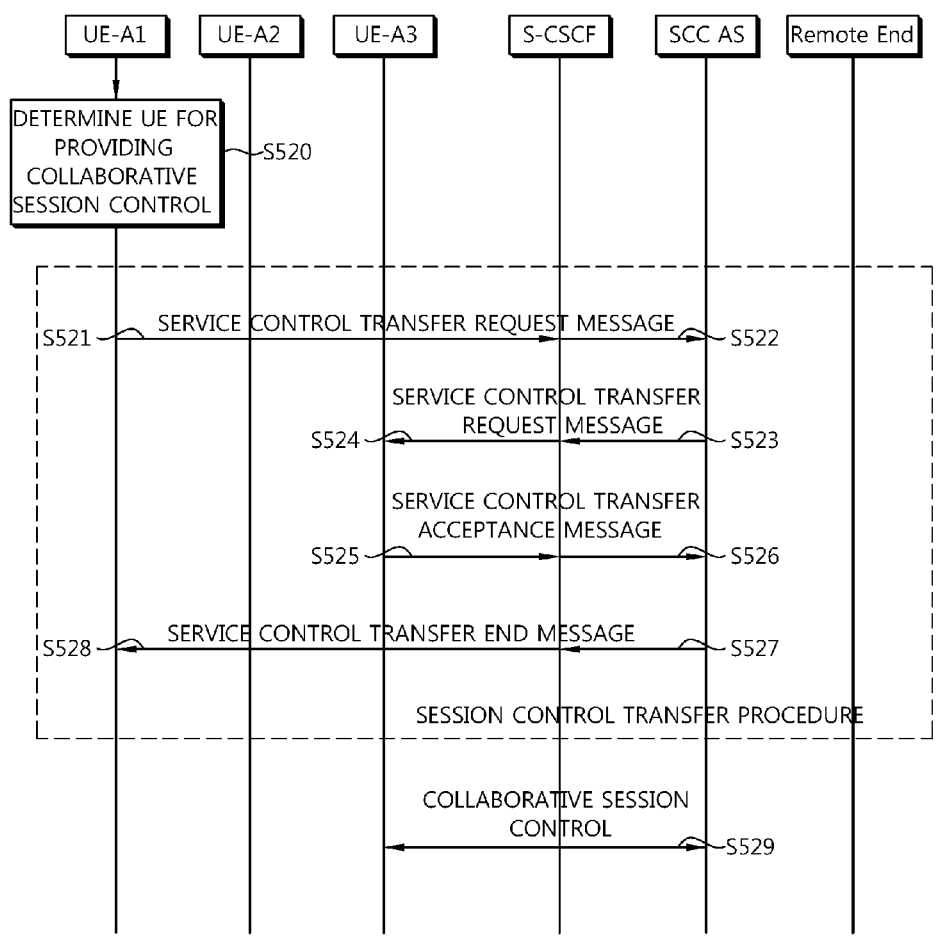

FIG. 9 and FIG. 10 are flowcharts showing a method of transferring service control for a media flow according to an embodiment of the present invention. In this case, an S-CSCF is used as an IMS network element for transmitting a notification message in the process of transmitting a service control flag. A process of performing IUT of service control for a media flow will be described.

Referring to FIG. 9 and FIG. 10, a UE-A1 transmits a register message including a service control flag to the S-CSCF to register to an IMS network (step S500). In this case, the service control flag indicates controller enable. The S-CSCF may store the service control flag of the UE-A1. When the UE-A1 is registered, the S-CSCF transmits a registration confirmation message to the UE-A1 (step S501). To receive notification of a change in state or capability information of different UEs, the UE-A1 transmits a subscription message to the S-CSCF (step S502), and in response thereto, the S-CSCF transmits a subscription acceptance message to the UE-A1 (step S503). Meanwhile, a session initiation procedure is performed according to a session initiation request of the UE-A1 (steps S504 to S509). The session initiation procedure is performed in the same manner as steps S200 to S205 of FIG. 5. Thereafter, video and voice media flows are transmitted between the UE-A1 and a remote UE (step S510), and the UE-A1 has a service control for the video and voice media flows (step S511).

Next, a UE-A2 performs a registration process (steps S512 and S513). A service control flag of the UE-A2 indicates controller disable. The S-CSCF transmits to the UE-A1 a notification message including information regarding the UE-A2 (step S514), and the UE-A1 transmits a notification confirmation message to the S-CSCF (step S515). The information regarding the UE-A2 includes a registration status of the UE-A2 or state or capability information of the UE-A2. In addition, the state or capability information of the UE-A2 includes registration status information of the UE-A2, information related to codec and media type supported by the UE-A2, configuration related information such as a screen size, and information related to a radio access network to which the UE-A2 is currently connected. Since the UE-A1 knows that the UE-A2 cannot act as a controller UE, the UE-A1 does not attempt to perform the transfer of collaborative session control to the UE-A2.

Finally, a UE-A3 performs a registration process (steps S516 and S517). A service control flag of the UE-A3 indicates controller enable. The S-CSCF transmits to the UE-A1 a notification message for notifying that the UE-A3 able to perform the transfer of collaborative session control, is registered to the IMS network (step S518). In response thereto, the UE-A1 transmits to the S-CSCF a notification confirmation message for indicating that the notification is confirmed (step S519).

UEs currently registered to the IMS network are the UE-A1, the UE-A2, and the UE-A3, and among them, the UE-A2 is a UE unable to perform the transfer of collaborative session control. Therefore, the collaborative session control cannot be transferred between the UE-A1 and the UE-A2, and the collaborative session control can be transferred between the UE-A1 and the UE-A3. Therefore, UE-A1 may consider the transfer of collaborative session control to the UE-A3.

When collaborative session control of the UE-A1 is intended to be transferred to a different UE, the UE-A1 determines a UE for providing service control on the basis of other UE s service control flag information included in a notification message received from the S-CSCF (step S520). The UE-A3 is a UE able to perform transfer of service control. If there is a command for transferring the service control to the UE-A3, the UE-A1 performs a procedure of transferring collaborative session control to the UE-A3 (steps S521 to S528). The collaborative session control transfer procedure is performed in the same manner as steps S209 to S216 of FIG. 6. As a result of service control transfer, voice and video media flows are transmitted and received between the UE-A1 and the remote UE, and the UE-A3 has a control for a collaborative session consisting of the voice and video media flows (step S529

Figure 11:
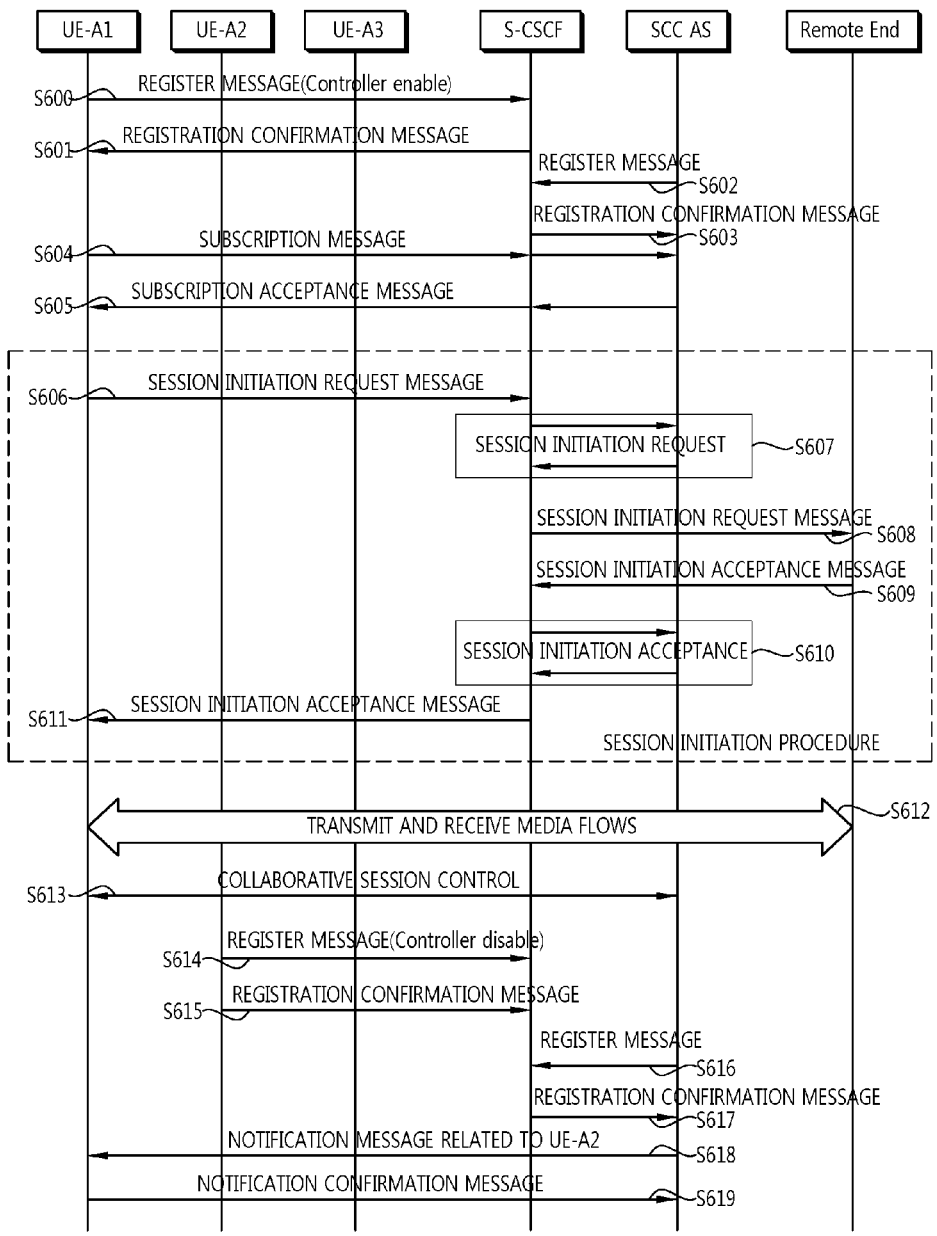
FIG. 11 and FIG. 12 are flowcharts showing a method of transferring service control for a media flow according to another embodiment of the present invention.
Figure 12:
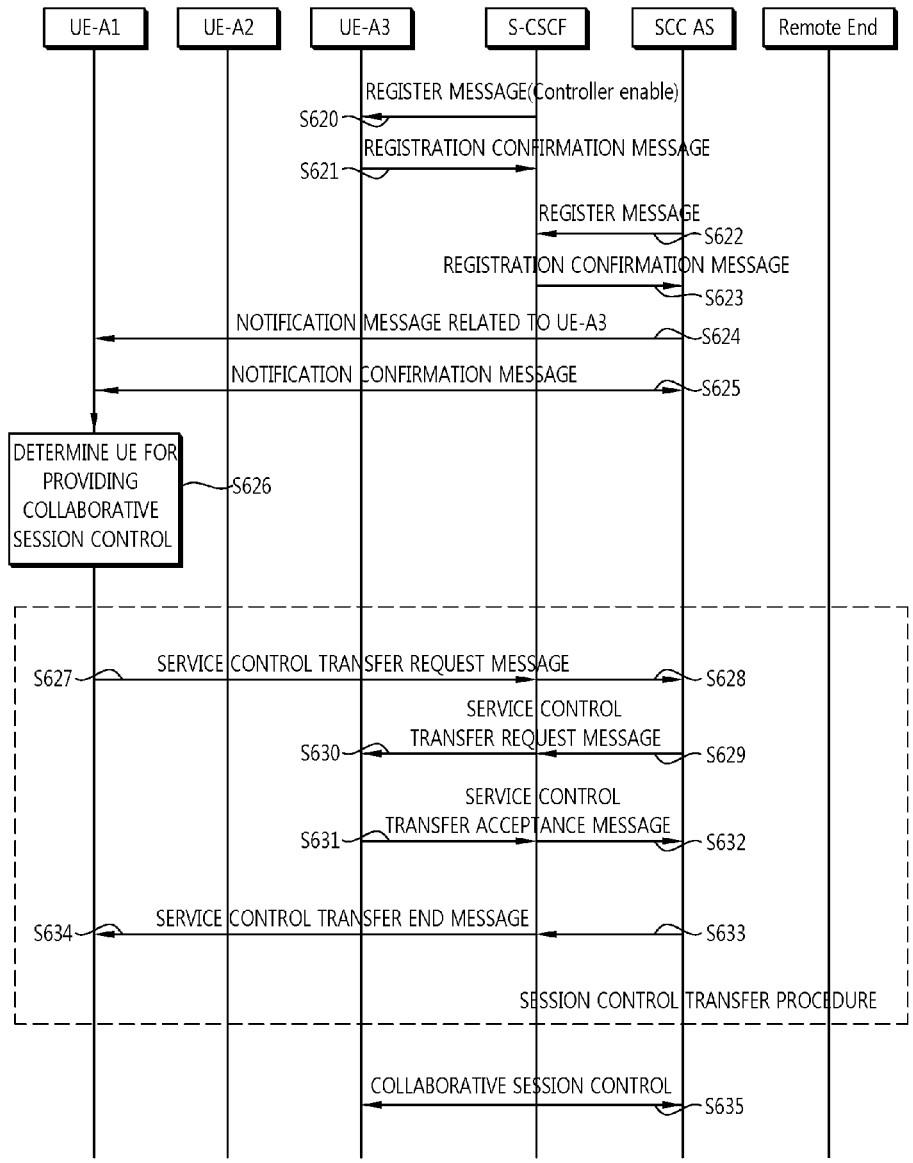

FIG. 11 and FIG. 12 are flowcharts showing a method of transferring service control for a media flow according to another embodiment of the present invention. Steps of FIG. 11 and FIG. 12 are identical to those of FIG. 9 and FIG. 10 except that an IMS network element for transmitting a notification message is an SCC AS, which will be easily understood by those ordinary skilled in the art.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for performing inter-user equipment (UE) transfer (IUT) of a collaborative session, the method performed by a UE and comprising:
    transmitting, by the UE, a subscription message to a network element for requesting notification of information regarding at least one or more other UEs;
    receiving, by the UE and from the network element, a subscription acceptance message in response to the subscription message;
    receiving, by the UE and from the network element, a notification message, wherein the notification message includes information regarding the at least one or more other UEs and a controller UE capability for controlling the collaborative session;
    selecting a UE capable of being a controller UE, to which control with respect to the collaborative session is to be transferred, based on the controller UE capability; and
    performing a process of transferring control with respect to the collaborative session established with a remote party to the selected UE, regardless of transferring the collaborative session to the selected UE.

2. The method of claim 1, wherein the network element is a serving-call session control function (S-CSCF) in an Internet protocol (IP) multimedia subsystem (IMS).

3. The method of claim 1, wherein the network element is a service centralization and continuity application service (SCC AS) which is an application server for supporting session continuity of a media flow.

4. The method of claim 1, wherein the subscription message and the subscription acceptance message are session initiation protocol (SIP) messages, and the SIP is a signaling protocol used for an IP-based multimedia service.

5. The method of claim 1, wherein the at least one or more other UEs belong to the same user.

6. The method of claim 1, wherein the at least one or more other UEs belong to a user different from a user of the UE.

7. The method of claim 1, wherein the information regarding the at least one or more other UEs includes a registration status or state.

8. The method of claim 7, wherein the state or capability information comprises a service control flag indicating enable or disable of the transfer of the collaborative session control.

9. The method of claim 8, wherein the state or capability information comprises registration status information of the at least one or more other UEs, information related to codec and media type supported by the at least one or more other UEs, configuration related information such as a screen size, and information related to a radio access network to which the at least one or more other UEs are currently connected.

10. The method of claim 1, wherein, after transferring control with respect to the collaborative session to the selected UE, the UE becomes a controllee UE to be coordinated by the controller UE.

* * * * *